(12) United States Patent
Reed et al.

(10) Patent No.: US 10,941,823 B2
(45) Date of Patent: Mar. 9, 2021

(54) SEGMENTED WEAR LINER

(71) Applicant: Goodrich Corporation, Charlotte, NC (US)

(72) Inventors: Eric Joseph Reed, Troy, OH (US); Gary C. Riebe, Tipp City, OH (US); Matthew R. O'Neil, Tipp City, OH (US)

(73) Assignee: Goodrich Corporation, Charlotte, NC (US)

( * ) Notice: Subject to any disclaimer, the term of this patent is extended or adjusted under 35 U.S.C. 154(b) by 162 days.

(21) Appl. No.: 15/822,365

(22) Filed: Nov. 27, 2017

(65) Prior Publication Data

US 2019/0162260 A1 May 30, 2019

(51) Int. Cl.
| | |
|---|---|
| *F16D 65/12* | (2006.01) |
| *F16D 55/24* | (2006.01) |
| *F16D 69/04* | (2006.01) |
| *F16D 55/36* | (2006.01) |

(Continued)

(52) U.S. Cl.
CPC .......... *F16D 65/122* (2013.01); *F16D 55/24* (2013.01); *F16D 55/36* (2013.01); *F16D 69/0408* (2013.01); *F16D 65/121* (2013.01); *F16D 2065/1312* (2013.01); *F16D 2065/1324* (2013.01); *F16D 2065/1348* (2013.01); *F16D 2065/1356* (2013.01); *F16D 2065/1372* (2013.01); *F16D 2065/1376* (2013.01); *F16D 2065/1392* (2013.01);

(Continued)

(58) Field of Classification Search
CPC .......... F16D 55/24; F16D 55/28; F16D 55/30; F16D 55/32; F16D 55/36; F16D 55/38; F16D 55/40; F16D 55/44; F16D 65/121; F16D 65/122; F16D 65/126; F16D 65/127; F16D 65/123; F16D 65/124; F16D 69/0408; F16D 2055/0058; F16D 2055/0095; F16D 2065/132; F16D 2069/0441; F16D 2200/0052; F16D 2065/1312; F16D 2065/1324; F16D 2065/1348; F16D 2065/1376; F16D 2065/1392; F16D 2065/1372; F16D 2065/1356; F16D 2069/0433; F16D 2069/009
USPC ........................... 188/218 XL, 250 B, 250 G
See application file for complete search history.

(56) References Cited

U.S. PATENT DOCUMENTS

| | | |
|---|---|---|
| 3,708,042 A | 1/1973 | Krause et al. |
| 3,710,914 A | 1/1973 | Lowey et al. |
| 3,731,769 A | 5/1973 | Ely |

(Continued)

FOREIGN PATENT DOCUMENTS

GB 2488654 9/2012

OTHER PUBLICATIONS

European Patent Office, European Search Report dated Apr. 4, 2019 in Application No. 18208687.6.

(Continued)

*Primary Examiner* — Pamela Rodriguez
(74) *Attorney, Agent, or Firm* — Snell & Wilmer L.L.P.

(57) ABSTRACT

A friction disk may comprise a friction disk core and a wear liner coupled to the friction disk core. A depression may be formed in a surface of the friction disk core. The wear liner may comprise a protrusion extending from a non-wear surface of the wear liner. The protrusion may be positioned within the depression of the friction disk core.

14 Claims, 9 Drawing Sheets

(51) Int. Cl.
*F16D 65/02* (2006.01)
*F16D 69/00* (2006.01)

(52) U.S. Cl.
CPC .............. *F16D 2069/009* (2013.01); *F16D 2069/0433* (2013.01); *F16D 2200/0052* (2013.01)

(56) References Cited

U.S. PATENT DOCUMENTS

| | | | |
|---|---|---|---|
| 3,747,712 A | 7/1973 | Stout | |
| 3,800,392 A | 4/1974 | Cook et al. | |
| 3,857,469 A | 12/1974 | Stimson | |
| 3,892,293 A | 7/1975 | Dowell | |
| 3,927,740 A | 12/1975 | Zarembka | |
| 3,951,240 A | 4/1976 | Dowell et al. | |
| 3,966,029 A | 6/1976 | Spain | |
| 4,007,814 A | 2/1977 | Berger | |
| 4,051,930 A | 10/1977 | Masclet | |
| 4,076,106 A | 2/1978 | Bermingham et al. | |
| 4,214,651 A | 7/1980 | Cunningham | |
| 4,276,969 A | 7/1981 | Chin et al. | |
| 4,742,948 A | 5/1988 | Fisher et al. | |
| 4,982,818 A | 1/1991 | Pigford | |
| 5,099,960 A | 3/1992 | Alev | |
| 5,558,186 A * | 9/1996 | Hyde .................. | F16D 55/40 188/218 XL |
| 5,769,185 A | 6/1998 | Main et al. | |
| 5,779,006 A | 7/1998 | Hyde et al. | |
| 5,992,577 A | 11/1999 | Souetre | |
| 6,318,511 B1 | 11/2001 | Clement et al. | |
| 6,439,353 B2 | 8/2002 | Roloff et al. | |
| 6,908,660 B2 | 6/2005 | Bauer et al. | |
| 7,090,057 B2 * | 8/2006 | Fryska .................. | F16D 65/12 188/18 A |
| 7,543,691 B2 * | 6/2009 | Hopkins ................ | F16D 65/12 188/218 XL |
| 7,766,133 B2 | 8/2010 | Cress | |
| 7,900,751 B2 | 3/2011 | Walker et al. | |
| 8,281,907 B2 * | 10/2012 | Fryska .................. | F16D 65/12 188/218 A |
| 8,573,369 B2 | 11/2013 | Scelsi et al. | |
| 8,789,665 B2 | 7/2014 | Gilboy et al. | |
| 9,194,447 B2 | 11/2015 | Kirkpatrick | |
| 9,315,261 B2 | 4/2016 | Kirkpatrick | |
| 9,366,302 B1 * | 6/2016 | Kirkpatrick .......... | F16D 65/12 |
| 9,541,145 B2 * | 1/2017 | Kirkpatrick .......... | F16D 65/12 |
| 9,587,691 B2 | 3/2017 | Kirkpatrick | |
| 2005/0011706 A1 | 1/2005 | Johnson | |
| 2007/0193836 A1 | 8/2007 | Walker et al. | |
| 2008/0041674 A1 | 2/2008 | Walker et al. | |
| 2008/0272235 A1 | 11/2008 | Cress et al. | |
| 2010/0025164 A1 | 2/2010 | Bingham et al. | |
| 2011/0220763 A1 | 9/2011 | Enright | |
| 2011/0272222 A1 | 11/2011 | Heffelfinger et al. | |
| 2015/0001017 A1 * | 1/2015 | Kirkpatrick .......... | F16D 65/12 188/218 XL |
| 2015/0129369 A1 * | 5/2015 | Kirkpatrick .......... | F16D 65/12 188/71.5 |
| 2016/0215838 A1 * | 7/2016 | Kirkpatrick ........... | F16D 65/127 |
| 2019/0017562 A1 * | 1/2019 | Fiala ...................... | F16D 55/36 |

OTHER PUBLICATIONS

European Patent Office, European Office Action dated Mar. 27, 2020 in Application No. 18208687.6.

* cited by examiner

SEGMENTED WEAR LINER

FIELD

The present disclosure relates to aircraft braking systems and, in particular, to segmented wear liners for friction disks.

BACKGROUND

Aircraft brake systems typically employ a series of friction disks that may be forced into contact with one another to stop the aircraft. The brake system generally includes non-rotating friction disks splined to a non-rotating wheel axle interspersed with rotating friction disks splined to the rotating wheel. The friction disk assemblies may comprise replaceable wear liners coupled to a reusable core. As the wear liners wear (i.e., thin), they may become susceptible to warpage.

SUMMARY

A friction disk is disclosed, in accordance with various embodiments. The friction disk may comprise a friction disk core and a first wear liner segment located over a first surface of the friction disk core. A second wear liner segment may be located over the first surface of the friction disk core. The first wear liner segment may be circumferentially adjacent to the second wear liner segment. The first wear liner segment and the second wear liner segment may each comprise a carbon composite material.

In various embodiments, a third wear liner segment may be located over a second surface of the friction disk core opposite the first surface of the friction disk core. A wear surface of the third wear liner segment may be oriented away from a wear surface of the first wear liner segment. A fourth wear liner segment may be located over the second surface of the friction disk core. The fourth wear liner segment may be circumferentially adjacent to the third wear liner segment. A first fastener may couple the first wear liner segment and the third wear liner segment to the friction disk core. A second fastener may couple the second wear liner segment and the fourth wear liner segment to the friction disk core.

In various embodiments, the first wear liner segment may comprise a protrusion extending from a non-wear surface of the first wear liner segment. The first fastener may be located through the protrusion. In various embodiments, the friction disk core may comprise a rotor core. In various embodiments, the friction disk core may comprise a stator core.

In various embodiments, the first wear liner segment and the second wear liner segment may each comprise a flange extending from an outer circumferential surface. In various embodiments, the first wear liner segment and the second wear liner segment may each comprise a flange extending from an inner circumferential surface.

In various embodiments, an annularly shaped wear liner may be disposed over a second surface of the friction disk core. The annularly shaped wear liner may comprise a plurality of wear liner segments.

A multi-disk brake system is also disclosed herein. According to various embodiments, the multi-disk brake system may comprise a first friction disk and a second friction disk. The first friction disk may comprise a first friction disk core and a first wear liner located over a first surface of the first friction disk core. The first wear liner may comprise a plurality of first wear liner segments. The second friction disk may comprise a second friction disk core and a second wear liner located over a first surface of the second friction disk core. The second wear liner may comprise a plurality of second wear liner segments.

In various embodiments, a plurality of first fasteners may couple the first wear liner segments to the first friction disk core. A plurality of second fasteners may couple the second wear liner segments to the second friction disk core. The first fasteners may be located through protrusions extending from a non-wear surface of the first wear liner. The first fasteners may be recessed with respect to a wear surface of the first wear liner.

In various embodiments, the first wear liner segments of the plurality of first wear liner segments may be coupled to the first friction disk core via a plurality of flanges located at an outer circumference of the first wear liner. The second wear liner segments may be coupled to the second friction disk core via a plurality of flanges located at an inner circumference of the second wear liner.

In various embodiments, the first wear liner and the second wear liner may comprise a carbon composite material. In various embodiments, the plurality of first wear liner segments may comprise between three first wear liner segments and six first wear liner segments.

A wear liner for a friction disk is also disclosed herein. In accordance with various embodiments, the wear liner may comprise a plurality of wear liner segments comprising a carbon composite material. The plurality of wear liner segments may jointly form a generally annular structure.

In various embodiments, the plurality of wear liner segments may comprise between three wear liner segments and six wear liner segments. In various embodiments, each wear liner segment of the plurality of wear liner segments may comprise a protrusion extending from a non-wear surface of the wear liner segment.

In various embodiments, each wear liner segment of the plurality of wear liner segments may comprise a flange extending from an outer circumferential surface of the wear liner segment. In various embodiments, each wear liner segment of the plurality of wear liner segments may comprise a flange extending from an inner circumferential surface of the wear liner segment.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

Figure 1:
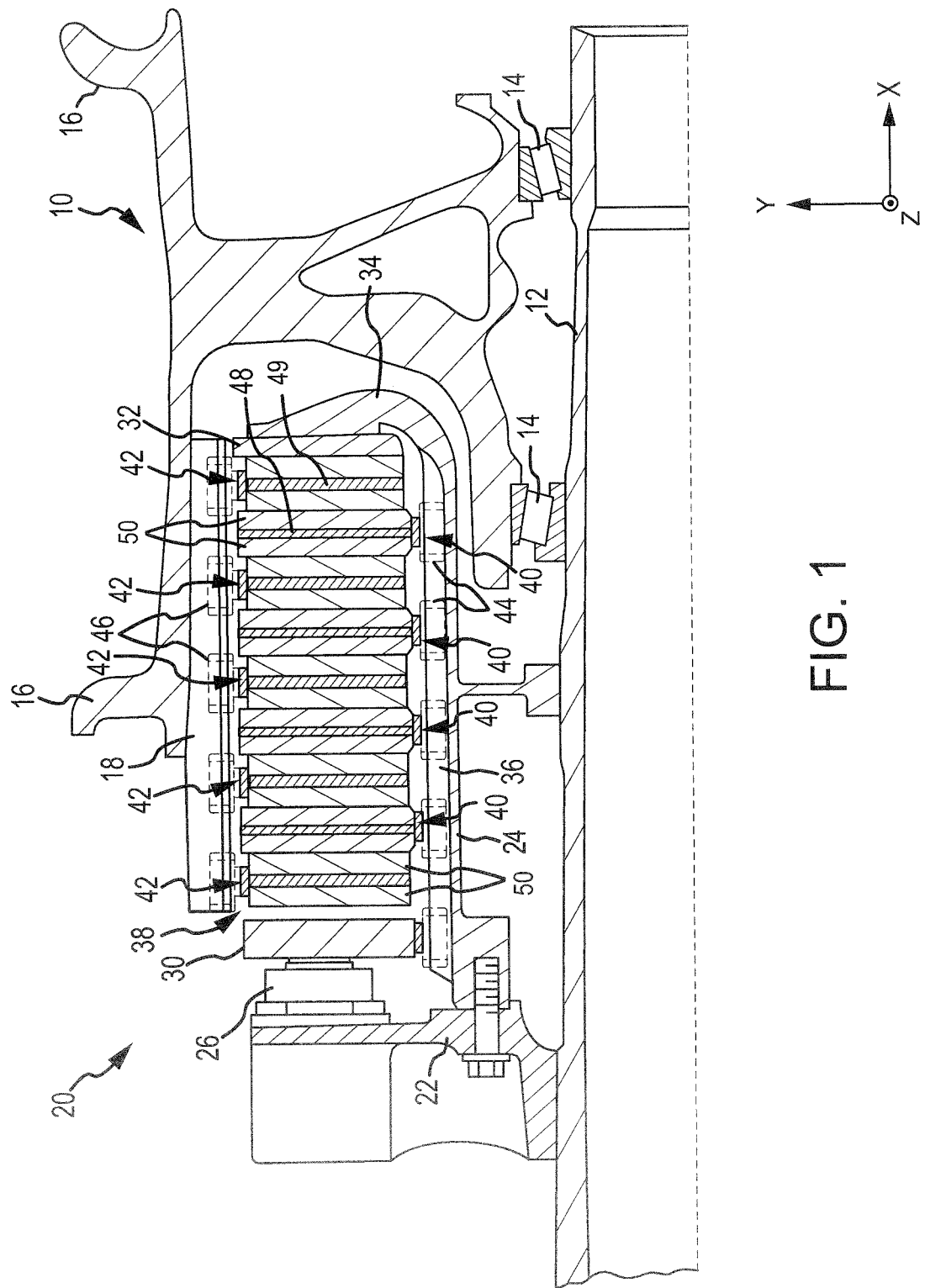
FIG. 1 illustrates a multi-disk brake system, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Throughout the present disclosure, like reference numbers denote like elements. Accordingly, elements with like element numbering may be shown in the figures, but may not necessarily be repeated herein for the sake of clarity. Cross hatching lines may be used throughout the figures to denote different parts, but not necessarily to denote the same or different materials.

In the case of components that rotate about a common axis, a first component that is "radially outward" of a second component means that the first component is positioned at a greater distance away from the common axis than the second component. A first component that is "radially inward" of a second component means that the first component is positioned closer to the common axis than the second component. In the case of components that rotate circumferentially about a common axis, a first component that is radially inward of a second component rotates through a circumferentially shorter path than the second component. As used herein, "distal" refers to the direction outward, or generally, away from a reference component. As used herein, "proximate" refers to a direction inward, or generally, towards the reference component.

Brake assemblies of the present disclosure may include friction disks having a friction disk core with wear liners coupled to thereto. The wear liners may be segmented such that each wear liner comprises a plurality of wear liner segments forming a generally annular, or ring, shaped wear liner. Stated differently, the wear liners may be constructed from multiple arcuate segments that jointly form an annular, 360 degree or substantially 360 degree wear liner. As used herein, "substantially 360 degree" means within 5 degrees of 360 degrees. The wear liner segments may be coupled to the friction disk core via a fastener located through a protrusion extending from a non-wear surface of the wear liner segment or via an inner circumferential flange or an outer circumferential flange of the wear liner segment. The wear liners being comprised of multiple segments, in various embodiments, as opposed to being a single, unibody ring, tends to alleviate warpage at high brake energy conditions. In this regard, segmented wear liners may allow the wear liners to be operated effectively at a thinner (i.e., more worn) state, resulting in a longer period of time on aircraft and a reduction in material waste.

Referring to FIG. 1, a multi-disk brake system 20 is illustrated according to various embodiments. The system may include a wheel 10 supported for rotation around axle 12 by bearings 14. Axle 12 defines an axis of multi-disk brake system 20 and the various components thereof. Any reference to the terms axis and axial may include an axis of rotation defined by axle 12 or a dimension parallel to such axis. Wheel 10 includes rims 16 for supporting a tire, and a series of axially extending rotor splines 18 (one shown). Rotation of wheel 10 is modulated by multi-disk brake system 20. Multi-disk brake system 20 includes torque flange 22, torque tube 24, a plurality of pistons 26 (one shown), pressure plate 30, and end plate 32. Torque tube 24 may be an elongated annular structure that includes reaction plate 34 and a series of axially extending stator splines 36 (one shown). Reaction plate 34 and stator splines 36 may be integral with torque tube 24, as shown in FIG. 1, or attached as separate components.

Multi-disk brake system 20 also includes a plurality of friction disks 38. The plurality of friction disks 38 includes at least one non-rotatable friction disk (stator) 40, and at least one rotatable friction disk (rotor) 42. Stators 40 may comprise a friction disk core (stator core) 48 and wear liners 50 located over opposing sides of the stator core 48. Rotors 42 may comprise a friction disk core (rotor core) 49 and wear liners 50 located over opposing sides of the rotor core 49. Each friction disk 38 includes an attachment structure. For example, stators 40 include a plurality of stator lugs 44 at circumferentially spaced positions around an inner circumference of stators 40, and rotors 42 include a plurality of rotor lugs 46 at circumferentially spaced positions around an outer circumference of rotors 42.

In various embodiments, pressure plate 30, end plate 32, and wear liners 50 are each annular structures made at least partially from a carbon composite material. In various embodiments, friction disk cores 48, 49 and wear liners 50 may comprise different materials. For example, friction disk cores 48, 49 may comprise a first material, for example, steel for titanium, and wear liners 50 may comprise a second material, for example, a carbon composite material. In various embodiments, friction disk cores 48, 49 and wear liners 50 may comprise the same material. For example, friction disk cores 48, 49 and wear liners 50 may both comprise a carbon composite material. The material of friction disk cores 48, 49 may be selected for its structural properties, thermal conductivity, heat capacity, and/or oxidation resistance properties, and the material of wear liners 50 may be selected for its wear resistance and/or frictional properties. Thus, friction disks 38 may experience the structural advantages of friction disk cores 48, 49 and the frictional advantages of wear liners 50.

Torque flange 22 is mounted to axle 12. Torque tube 24 is bolted to torque flange 22 such that reaction plate 34 is near an axial center of wheel 10. End plate 32 is connected to a surface of reaction plate 34 facing axially away from the axial center of wheel 10. Thus, end plate 32 is non-rotatable by virtue of its connection to torque tube 24. Stator splines 36 may support pressure plate 30 such that pressure plate 30 is also non-rotatable. Stator splines 36 also support stators 40. Stators 40 engage stator splines 36 with gaps formed between stator lugs 44. Similarly, rotors 42 engage rotor splines 18 with gaps formed between rotor lugs 46. Thus, rotors 42 are rotatable by virtue of their engagement with rotor splines 18 of wheel 10.

In various embodiments, rotors 42 are arranged with end plate 32 on one end, pressure plate 30 on the other end, and stators 40 interleaved such that rotors 42 are adjacent to non-rotatable friction components. Pistons 26 are connected to torque flange 22 at circumferentially spaced positions around torque flange 22. Pistons 26 face axially toward wheel 10 and contact a side of pressure plate 30 opposite rotors 42. Pistons 26 may be powered electrically, hydraulically, or pneumatically. In response to actuation of pistons 26, a force towards reaction plate 34 is exerted on friction disks 38 such that rotors 42 and stators 40 are pressed together between pressure plate 30 and end plate 32.

Figure 2A:
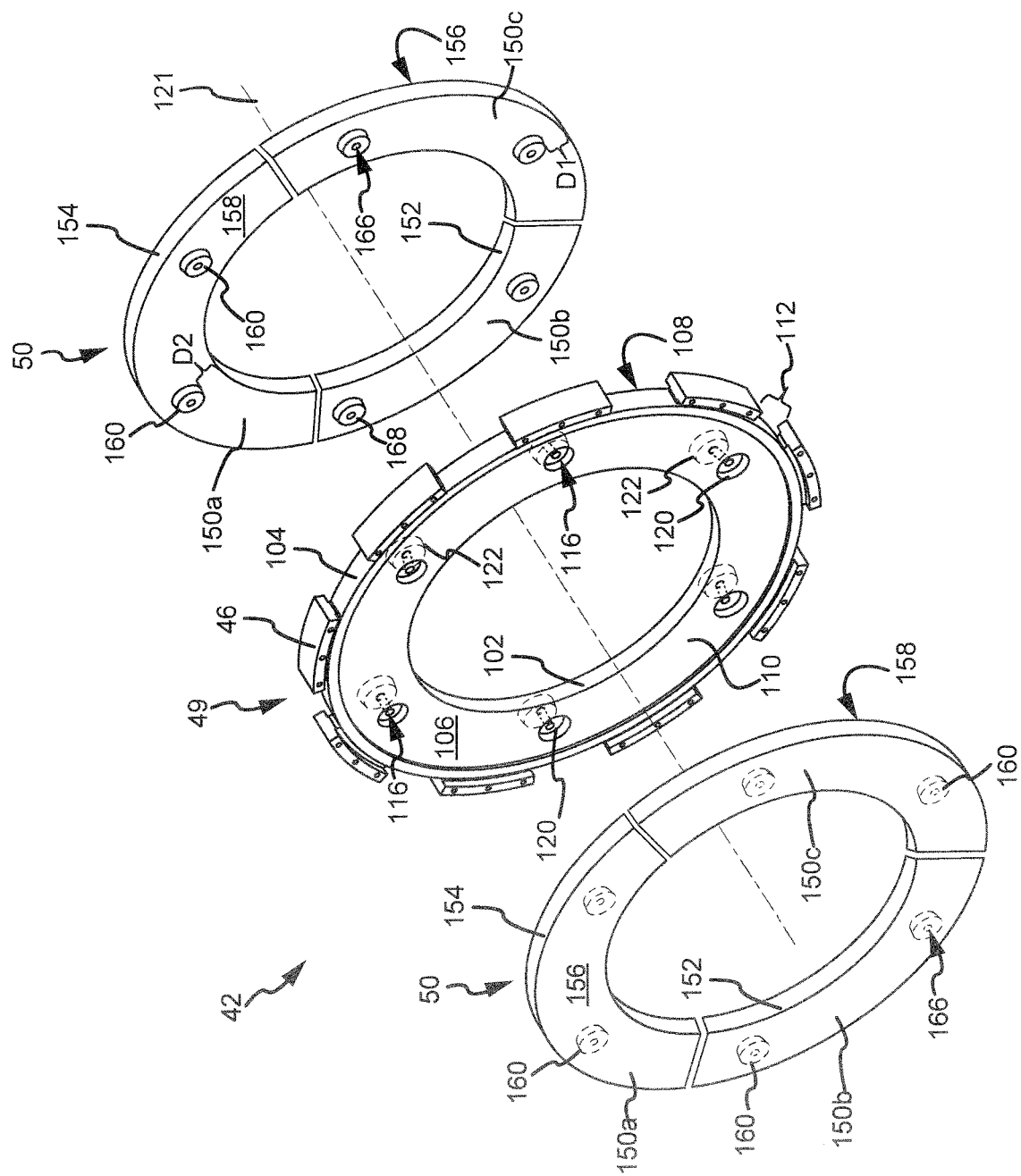
FIG. 2A illustrates an exploded view of a rotor having segmented wear liners comprising integrated torque buttons, in accordance with various embodiments.

Referring to FIG. 2A, an exploded view of a rotor 42 having a segmented wear liner with integrated torque buttons is illustrated, according to various embodiments. Rotor 42 may comprise rotor core 49 and two wear liners 50 located over opposing surfaces of rotor core 49. Wear liners 50 may be segmented such that each wear liner 50 comprises a plurality of wear liner segments (e.g., first wear liner segment 150a, second wear liner segment 150b, and third wear liner segment 150c). Wear liner segments 150a, 150b, and 150c are located circumferentially adjacent one another over surfaces 106 and 108 of rotor core 49. Wear liner segments 150a, 150b, and 150c may jointly form an generally annular or ring-shaped structure (i.e., wear liner 50). Stated differently, wear liner 50 may be constructed from multiple arcuate segments that jointly extend substantially 360 degrees around an axis 121. As used herein, "substantially 360 degrees" means within 5 degrees of 360 degrees. In this regard, in various embodiments, wear liner segments 150a, 150b, and 150c may be coupled to rotor core 49 with a small gap or space between adjacent segments to allow for thermal expansion of wear liner segments 150a, 150b, and 150c and/or rotor core 49.

While wear liners 50 are shown including three wear liner segments (i.e., 150a, 150b, and 150c), it should be understood that wear liners 50 as disclosed herein may comprise any number of wear liner segments. In various embodiments, wear liners 50 may each comprise between two wear liner segments and eight wear liner segments. In various embodiments, wear liners 50 may each comprise between three wear liner segments and six wear liner segments. The wear liner segments may be approximately equal in inner and outer circumferential length. As used herein, "approximately equal" means±3.0% of the total outer circumferential length of the wear liner.

Figure 6A:
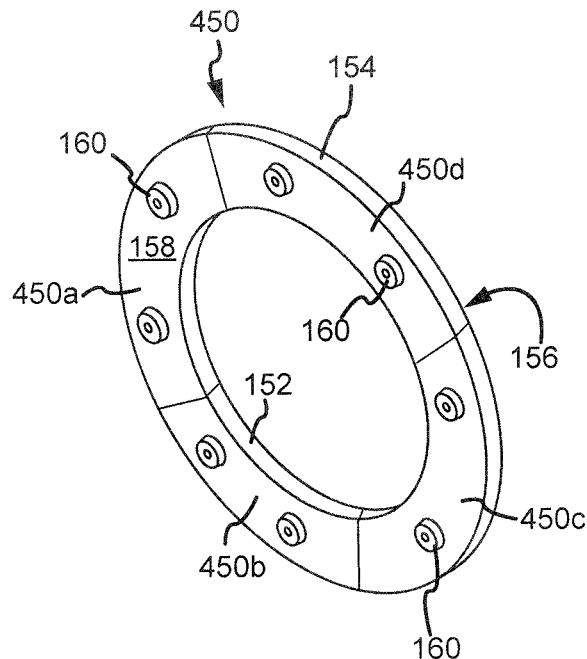
FIGS. 6A, 6B, and 6C illustrate segmented wear liners, in accordance with various embodiments.

With reference to FIG. 6A, a wear liner 450 comprising four wear liner segments is illustrated, in accordance with various embodiments. Wear liner 450 comprises four wear liner segments: 450a, 450b, 450c, and 450d. Each wear liner segment forms approximately 25% (i.e., one-fourth or 90 degrees) of the total circumference of the wear liner 450. As used herein, "approximately" means±3%.

Figure 6B:
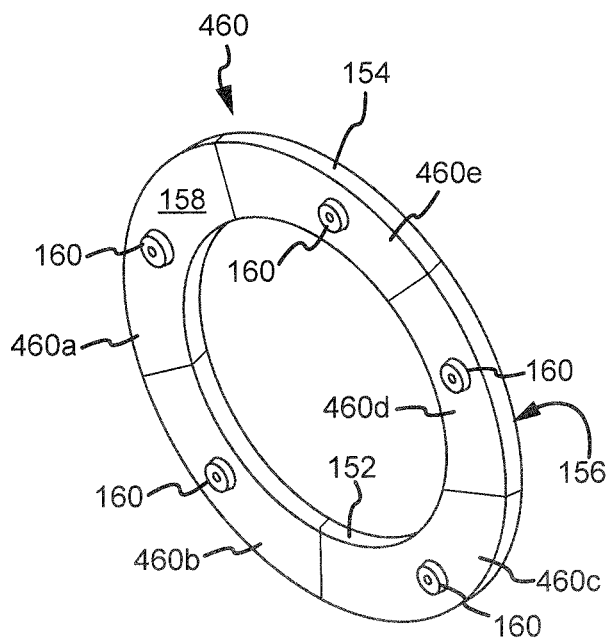

With reference to FIG. 6B, a wear liner 460 comprising five wear liner segments is illustrated, in accordance with various embodiments. Wear liner 460 comprises five wear liner segments: 460a, 460b, 460c, 460d, and 460e. Each wear liner segment forms approximately 20% (i.e., one-fifth or 72 degrees) of the total circumference of wear liner 460. As used herein, "approximately" means±3%.

Figure 6C:
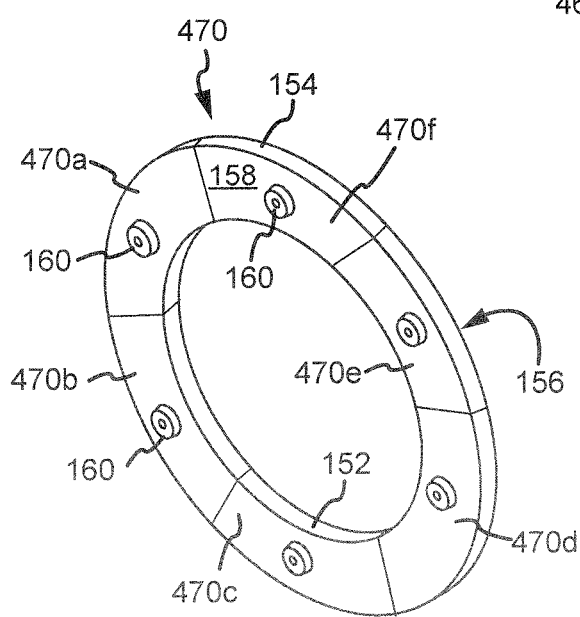

With reference to FIG. 6C, a wear liner 470 comprising six wear liner segments is illustrated, in accordance with various embodiments. Wear liner 470 comprises six wear liner segments: 470a, 470b, 470c, 470d, 470e, and 470f. Each wear liner segment forms approximately 16.67% (i.e., one-sixth or 60 degrees) of the total circumference of wear liner 470. As used herein, "approximately" means ±3%.

Wear liners 50, including wear liner segments 150a, 150b, and 150c, comprise an inner circumferential surface 152 and an outer circumferential surface 154. Wear liners 50, including wear liner segments 150a, 150b, and 150c, further comprise a wear surface 156 and a non-wear surface 158 opposite wear surface 156. Wear surface 156 extends from inner circumferential surface 152 to outer circumferential surface 154 and is oriented away from rotor core 49. Non-wear surface 158 extends from inner circumferential surface 152 to outer circumferential surface 154 and is oriented toward rotor core 49. In various embodiments, wear liner segments 150a, 150b, and 150c each include at least on torque button (protrusion) 160. Protrusions 160 may extend (i.e., protrude) from non-wear surface 158 in an axial direction toward rotor core 49. Protrusions 160 may comprise a generally cylindrical or frustoconical shape.

Protrusions 160 may be located a distance D1 from outer circumferential surface 154 and a distance D2 from inner circumferential surface 152. In various embodiments, distance D1 may be about equal to distance D2. As used herein "about equal" means±0.05 inches (±0.05 cm). In various embodiments, distance D1 may be greater than distance D2. In various embodiments, distance D2 may be greater than distance D1. The location and configuration of protrusions 160 may be selected to minimize vibration.

Rotor core 49 may comprise a rotor spine 110 and rotor lugs 46. Rotor core 49 may engage rotor splines 18 (FIG. 1) in rotor gaps 112 formed between rotor lugs 46. In this regard, rotor 42 may be rotatable by virtue of the engagement between rotor lugs 46 and rotor splines 18 of wheel 10 (FIG. 1). Rotor core 49 further comprises a first surface 106 and a second surface 108 opposite first surface 106. First surface 106 and second surface 108 may extend along rotor spine 110 between an inner circumferential surface 102 and outer circumferential surface 104 of rotor core 49. A plurality of first depressions 120 may be formed in, and defined by, first surface 106. A plurality of second depressions 122 may be formed in, and defined by, second surface 108. First depressions 120 may be axially aligned with second depressions 122. First depressions 120 and second depressions 122 may each be formed partially through rotor core 49 such that a portion of rotor core 49 remains between a bottom, or axially inward, surface of first depressions 120 and a bottom, or axially inward, surface of second depressions 122.

First depressions 120 and second depressions 122 may comprise a generally cylindrical or frustoconical shape. The shape of first depressions 120 and second depressions 122 may complement the shape of protrusions 160.

An opening 166 may be formed through protrusions 160. Openings 166 may extend completely through wear liners 50 such that openings 166 extend from wear surface 156 to a surface 168 of protrusion 160 opposite wear surface 156. An opening 116 may be formed through first depressions 120 and second depressions 122. Openings 116 may extend completely through rotor core 49. With momentary reference to FIG. 2C, openings 116 may extend from the bottom or axially inward, surface 130 of first depressions 120 to the bottom, or axially inward, surface 132 of second depressions 122. Openings 116 may be aligned with openings 166 and may be configured to receive a fastener for securing wear liners 50 to rotor core 49.

Figure 2B:
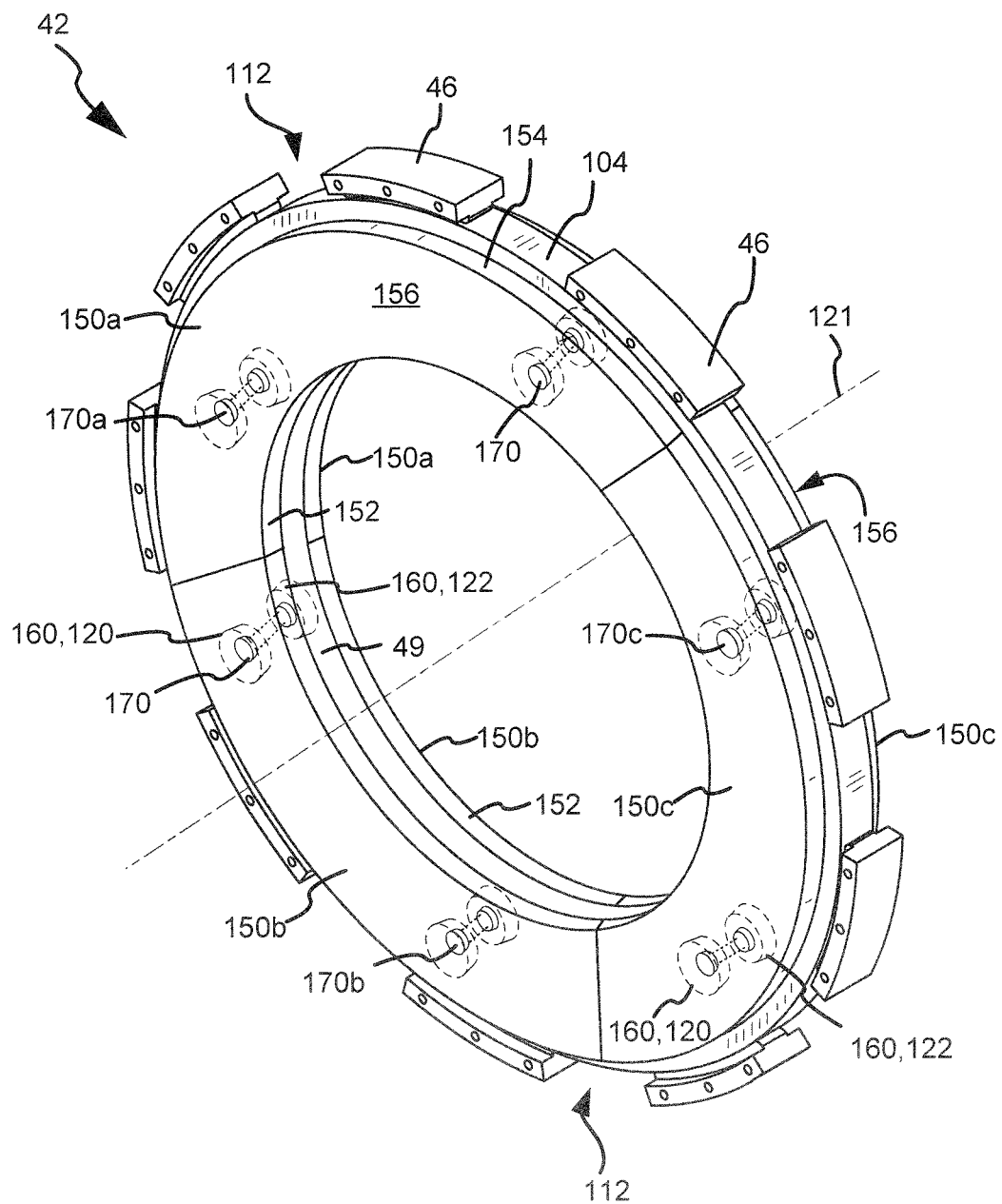
FIG. 2B illustrates a perspective view of an assembled rotor having segmented wear liners comprising integrated torque buttons, in accordance with various embodiments.

Referring to FIG. 2B, an assembled rotor 42 is illustrated. With combined reference to FIG. 2A and FIG. 2B, protrusions 160 may be located and/or positioned within first depressions 120 and second depressions 122. In this regard, the protrusions 160 adjacent to first surface 106 of rotor core 49 may be positioned within first depressions 120, and the protrusions 160 adjacent to second surface 108 of rotor core 49 may be positioned with second depressions 122. Fasteners 170 may couple or otherwise secure wear liners 50 to rotor core 49. Fasteners 170 may comprise a rivet, bolt, pin, screw, or other suitable securement mechanism. Fasteners 170 may be located through protrusions 160. Fasteners 170 extend between opposing wear liner segments. For example, fastener 170a extends between opposing wear liner segments 150a. Fastener 170b extends between opposing wear liner segments 150b. Fastener 170c extends between opposing wear liner segments 150c. In this regard, fasteners 170 may couple wear liner segments 150a, 150b, and 150c to rotor core 49.

Figure 2C:
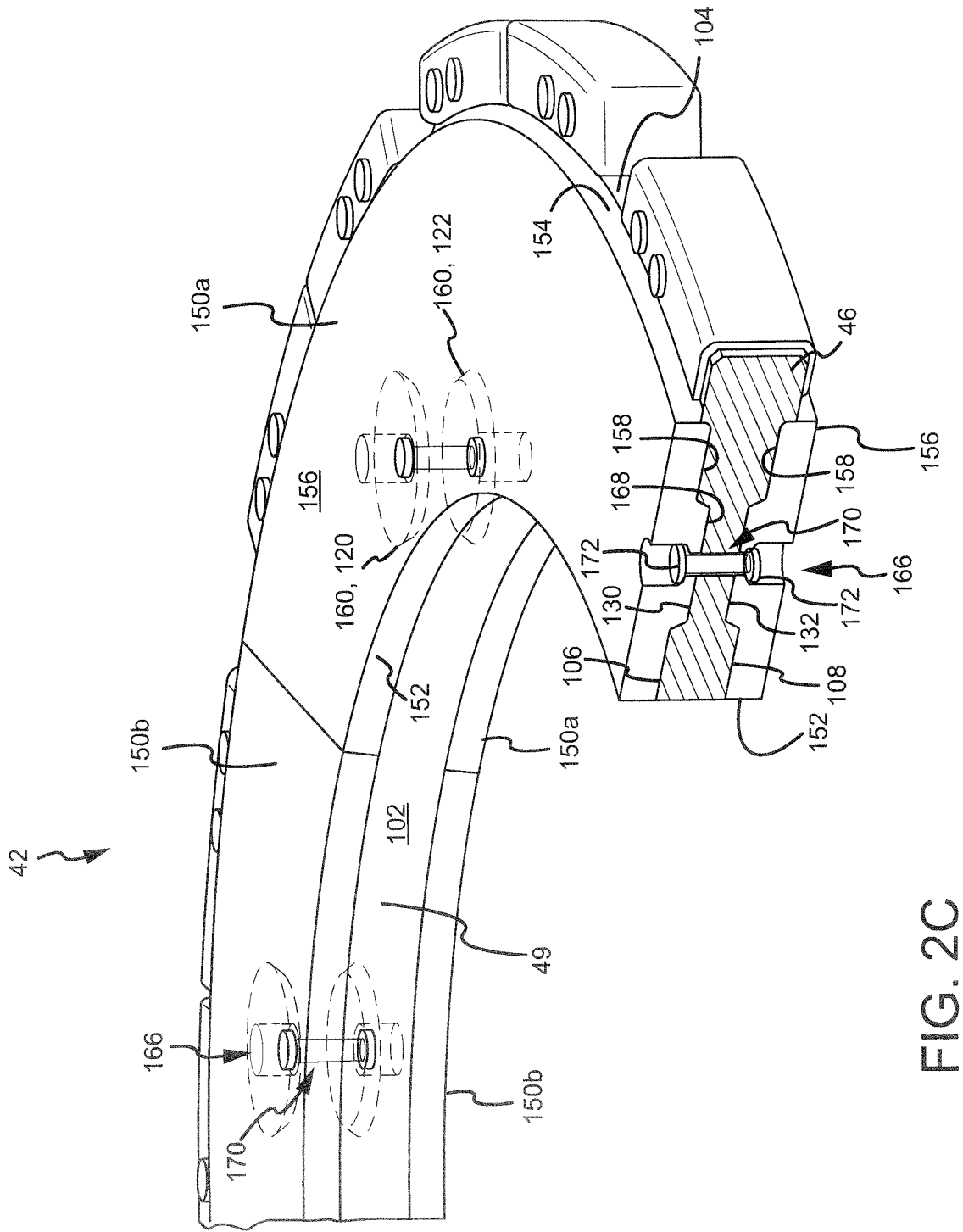
FIG. 2C illustrates a cross-section view of a rotor having segmented wear liners comprising integrated torque buttons, in accordance with various embodiments.

Referring to FIG. 2C, a cutaway view of assembled rotor 42 is illustrated, according to various embodiments. Openings 166 may include a counterbore configured to receive fastener 170. Heads 172 of fasteners 170 may be recessed with respect to wear surface 156. Locating fasteners 170 through protrusion 160 may allow the heads 172 of fasteners 170 to be located a greater distance from wear surface 156. In various embodiments, after wear liners 50 have been fully worn (i.e., after wear liners 50 have been worn below a suitable operational thickness), heads 172 of fasteners 170 may remain recessed with respect to wear surface 156.

Figure 3:
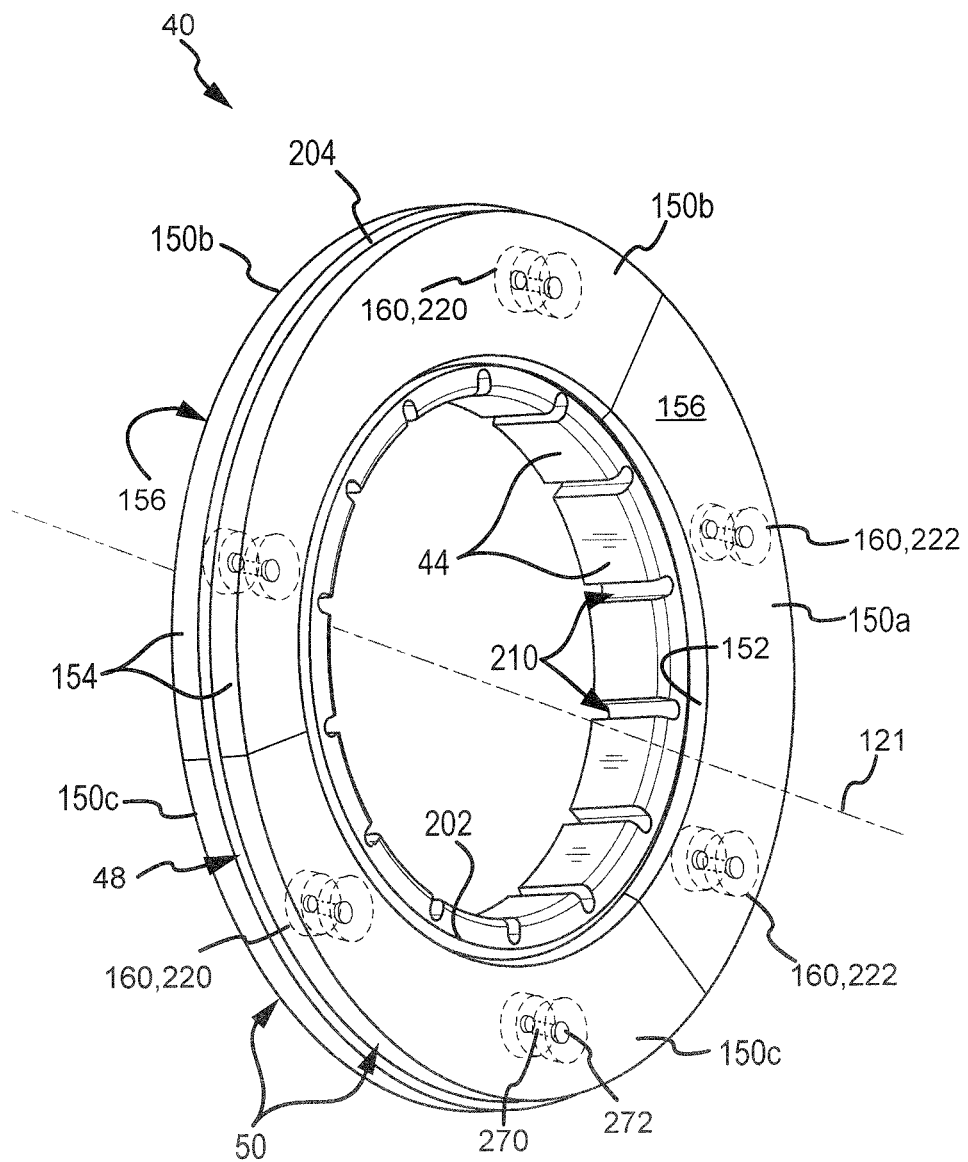
FIG. 3 illustrates a perspective view of an assembled stator having segmented wear liners comprising integrated torque buttons, in accordance with various embodiments.

Referring to FIG. 3, an assembled stator 40 comprising wear liner segments having integrated torque buttons is illustrated, according to various embodiments. Stator 40 may comprise a stator core 48 and wear liners 50. Stator core 48 may comprise stator lugs 44. Stator lugs 44 may be located along an inner circumferential surface 202. Stator gaps 210 may be located between stator lugs 44. Stator gaps 210 may be positioned to align with stator splines 36 (FIG. 1). The engagement between the stator splines 36 and stator lugs 44 may prevent stator core 48 from rotating in response to a torque being applied to stator 40 during braking. Stator core 48 may include opposing first and second surfaces extending between inner circumferential surface 202 and an outer circumferential surface 204.

A plurality of first depressions 220 may be formed in the first surface of stator core 48. A plurality of second depressions 222 may be formed in the second surface of stator core 48. First depressions 220 may axially aligned with second depressions 222. First depressions 220 and second depressions 222 may each be formed partially through stator core 48 such that a portion of stator core 48 remains between a bottom, or axially inward, surface of first depressions 220 and a bottom, or axially inward, surface of second depressions 222. Protrusions 160 may be located and/or positioned in first depressions 220 and second depressions 222.

Wear liners 50, including wear liner segments 150a, 150b, and 150c, may be coupled to stator core 48 with wear surface 156 oriented away from stator core 48 and protrusions 160 oriented toward stator core 48. Fasteners 270, similar to fasteners 170 in FIG. 2B, may be located through protrusion 160 and may couple wear liner segments 150a, 150b, and 150c to stator core 48.

In various embodiments, wear liner segments 150a, 150b, and 150c, may have an identical or substantially similar configuration. In this regard, the configuration of depressions 120, 122 in rotor core 49 may be identical or substantially similar to the configuration of depressions 220, 222 in stator core 48 such that wear liner segments 150a, 150b, and 150c may be compatible with both (i.e., interchangeable between) rotor core 49 and stator core 48.

During braking, the wear surface 156 of rotor 42 wear liners 50 may contact the wear surface 156 of stator 40 wear liners 50, which may create the friction necessary to decelerate the aircraft. In various embodiments, wear liners 50 may be replaceable, such that after wear liners 50 have been worn below a suitable operational thickness, wear liners 50 may be removed from rotor core 49 and/or stator core 48 and replaced with new or remanufactured wear liners 50. Wear liners 50 formed from a plurality of discrete segments tend to be less susceptible to warpage as compared to unibody wear liners of similar thickness. In this regard, wear liners 50 being segmented may allow a greater volume of wear liners 50 to be consumed (i.e. used, worn) prior to replacement.

Figure 4A:
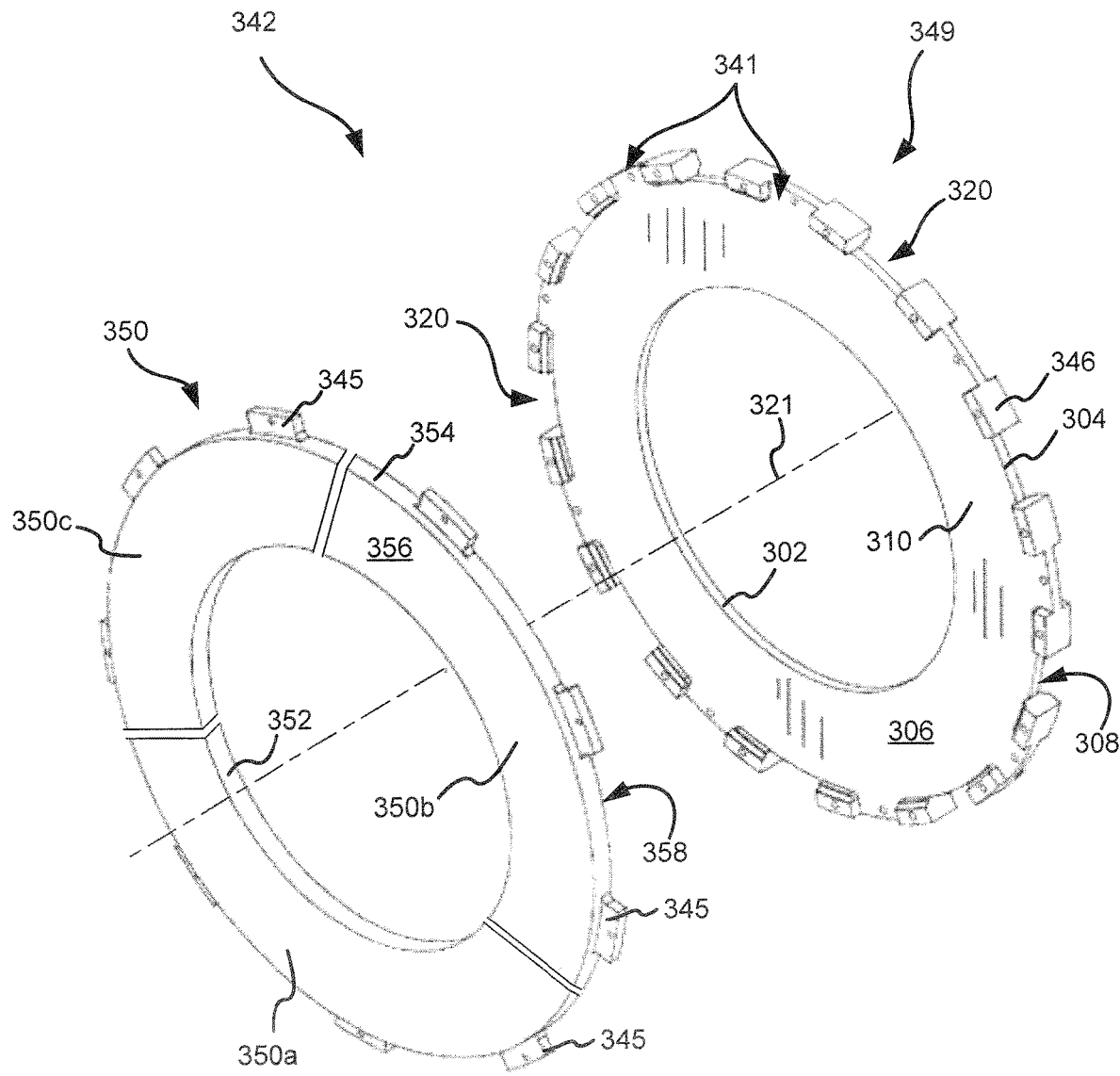
FIG. 4A illustrates an exploded view of a rotor having segmented wear liners, in accordance with various embodiments.

Referring to FIG. 4A, an exploded view of a rotor 342 having a segmented wear liner with outer circumferential flanges is illustrated, according to various embodiments. Rotor 342 may comprise a rotor core 349, and rotor wear liners 350 (one shown) disposed over opposing surfaces of rotor core 349. Rotor core 349 may comprise a rotor spine 310 and rotor lugs 346. Rotor 342 may engage rotor splines 18 (FIG. 1) in rotor gaps 320 formed between rotor lugs 346. Rotor 342 may be rotatable by virtue of the engagement between rotor lugs 346 and rotor splines 18 of wheel 10, with momentary reference to FIG. 1.

Rotor core 349 comprises an inner circumferential surface 302 and an outer circumferential surface 304. Rotor lugs 346 may be located along outer circumferential surface 304. Rotor core 349 further comprises opposing sides 306 and 308, which extend from inner circumferential surface 302 to outer circumferential surface 304. Rotor core 349 may further comprise rotor core key notches 341. Rotor core key notches 341 may be a recessed portion of rotor lugs 346 such that rotor lugs 346 have a decreased thickness at rotor core key notches 341.

Wear liner 350 may be segmented such that wear liner 350 comprises a plurality of wear liner segments (e.g., first wear liner segment 350a, second wear liner segment 350b, and third wear liner segment 350c). Wear liner segments 350a, 350b, and 350c may jointly form a generally annular or ring-shaped structure (i.e., wear liner 350). Stated differently, wear liner 350 may be constructed from multiple arcuate segments that together extend substantially 360 degrees around an axis 321. As used herein, "substantially 360 degrees" means within 5 degrees of 360 degrees. While wear liner 350 is shown including three wear liner segments (350a, 350b, and 350c), it should be understood that wear liner 350 may comprise any number of wear liner segments.

Wear liner 350, including wear liner segments 350a, 350b, and 350c, comprises an inner circumferential surface 352 and an outer circumferential surface 354. Wear liner 350, including wear liner segments 350a, 350b, and 350c, further comprises a wear surface 356 and a non-wear surface 358 opposite wear surface 156. Wear surface 356 is oriented away from rotor core 349. Non-wear surface 358 is oriented toward rotor core 349. In various embodiments, wear liner segments 350a, 350b, and 350c each include at least one rotor key (flange) 345. Flanges 345 may be located along and extend radially outward from outer circumferential surface 354. Flanges 345 may be sized and shaped to fit into rotor core key notches 341.

Figure 4B:
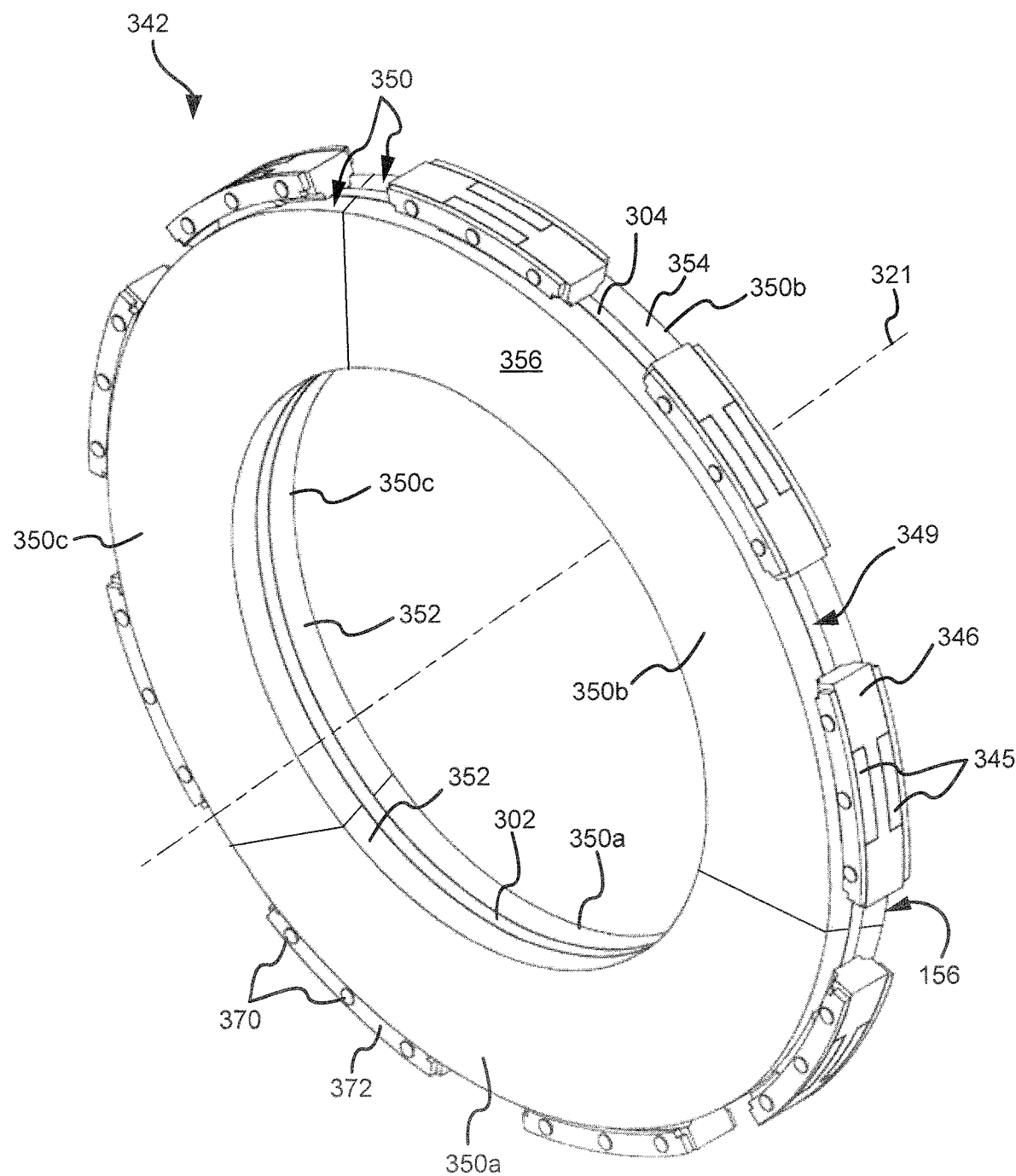
FIG. 4B illustrates a perspective view of an assembled rotor having segmented wear liners, in accordance with various embodiments.

Referring to FIG. 4B, an assembled rotor 342 having segmented wear liners with outer circumferential flanges is illustrated, according to various embodiments. Rotor wear liners 350, including wear liner segments 350a, 350b, and 350c, may be coupled to opposing sides 306 and side 308, with momentary reference to FIG. 4A, of a rotor core 349. In various embodiments, rotor wear liners 350, including wear liner segments 350a, 350b, and 350c, may be coupled to rotor core 349 by a plurality of fasteners 370 and cover plates 372. Fasteners 370 may comprise rivets, clips, screws, bolts, or other suitable securement mechanism. In various embodiments, fasteners 370 may extend through cover plates 372, flanges 345, and rotor lugs 346, in various embodiments, rotor wear liners 350, including wear liner segments 350a, 350b, and 350c, may be bonded to rotor core 349. In various embodiments, rotor wear liners 350, including wear liner segments 350a, 350b, and 350c, may be floating, such that wear liner segments 350a, 350b, and 350c are positioned adjacent to rotor core 349 without being fastened thereto.

Figure 5:
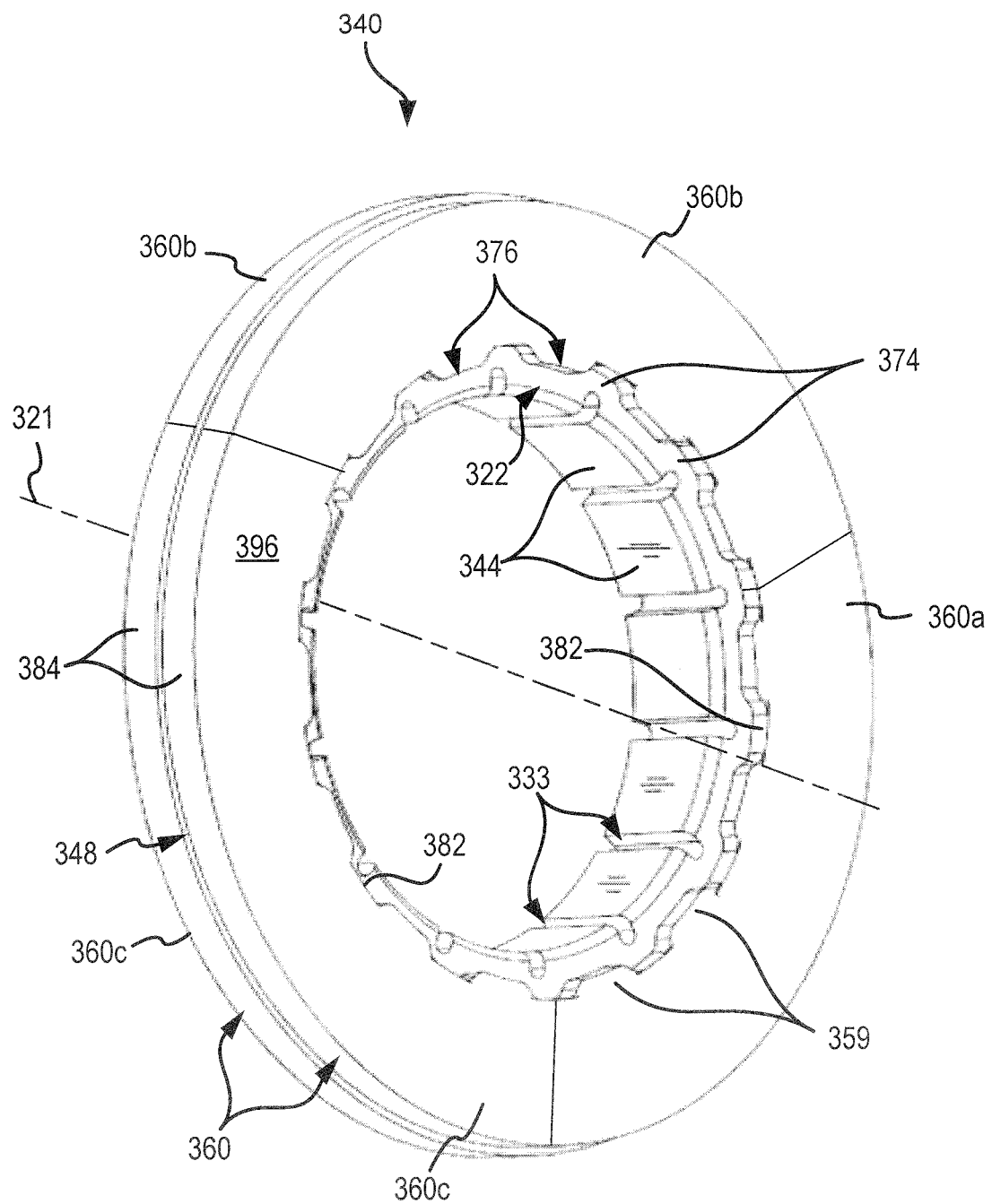
FIG. 5 illustrates a perspective view of an assembled stator having segmented wear liners.

Referring to FIG. 5, an assembled stator 340 having segmented wear liners with inner circumferential flanges is illustrated, according to various embodiments. Stator 340 may comprise a stator core 348 and stator wear liners 360 located over opposing sides of stator core 348. Stator core 348 may comprise stator lugs 344 located along and extending radially inward from an inner circumferential surface 322 of stator core 348. Gaps 333 may be located between stator lugs 344. Gaps 333 may be configured to align with stator splines 36 (FIG. 1). The engagement between the stator splines 36 and stator lugs 344 may prevent stator 340 from rotating when a torque is applied to stator 340 during braking.

Stator core 348 may further comprise core keys 374 and core key notches 376 located proximate inner circumferential surface 322 of stator core 348. Core keys 374 may comprise radially outward extending teeth. Core key notches 376 may be radially inward extending recesses located between core keys 374.

Wear liners 360 may be segmented such that each wear liner 360 comprises a plurality of wear liner segments (e.g., first wear liner segment 360a, second wear liner segment 360b, and third wear liner segment 360c). Wear liner segments 360a, 360b, and 360c may jointly form an annular or ring-shaped structure (i.e., wear liner 360). Stated differently, wear liners 360 may be constructed from multiple arcuate segments that together extend substantially 360 degrees around axis 321. As used herein, "substantially 360 degrees" means within 5 degrees of 360 degrees. While wear liners 360 are shown including three wear liner segments (360a, 360b, and 360c), it should be understood that wear liners 360 may comprise any number of wear liner segments.

Wear liners 360, including wear liner segments 360a, 360b, and 360c, comprise an inner circumferential surface 382 and an outer circumferential surface 384. Wear liners 360, including wear liner segments 360a, 360b, and 360c, further comprise a wear surface 396 and a non-wear surface opposite wear surface 396. Wear surface 396 is oriented away from stator core 348. In various embodiments, wear liner segments 360a, 360b, and 360c each include at least one stator key (flange) 359. Flanges 359 may be located along and extend radially inward from inner circumferential surface 382. Flanges 359 may be sized and shaped to fit into core key notches 376. In this regard, stator core keys 374 may be sized and shaped to fit in between flanges 359.

Wear liners 360 may be coupled to stator core 348 by, for example, a bond. In various embodiments, a bond may comprise an adhesive capable of maintaining adhesion under high temperatures, for example, between about 800° F. (about 426° C.) and 2000° F. (about 1093° C.). In various embodiments, an adhesive may be applied via chemical vapor deposition. In various embodiments, wear liners 360 may be coupled to stator core 348 by mechanical fastening through flanges 359. For example, wear liners 360 may be coupled to stator core 348 via rivets, clips, bolts, or other suitable fastener secured to flanges 359. In various embodiments, wear liners 360 are kept in place by contact from adjacent components, such as wear liners 350 attached to rotor 342, with momentary reference to FIG. 4B.

Referring to FIG. 4B and FIG. 5, during braking, wear surface 356 of wear liners 350 may contact wear surface 396 wear liners 360, which may create the friction necessary to decelerate the aircraft. In various embodiments, wear liners 350 and 360 may be replaceable, such that after wear liners 350 and/or 360 have been worn below a suitable operational thickness, wear liners 350 and/or 360 may be removed from rotor core 349 and/or stator core 348, respectively, and replaced with new or remanufactured wear liners. Wear liners 350 and 360 being formed from a plurality of discrete segments tend to be less susceptible to warpage as compared to unibody wear liners of similar thickness. In this regard, wear liners 350 and 360 being segmented may allow a greater volume of the wear liner to be consumed (i.e. used, worn) prior to replacement.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A. B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment". "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A friction disk, comprising:
a friction disk core including a first surface and a second surface opposite the first surface, wherein the first surface of the friction disk core defines a first depression and the second surface of the friction disk core defines a second depression, the second depression being axially aligned with the first depression, and wherein the first depression and the second depression are each be formed partially through the friction disk core such that a portion of the friction disk core remains between a bottom surface of the first depression and a bottom surface of the second depression;
a first wear liner segment located over the first surface of the friction disk core, the first wear liner segment comprising a first protrusion extending from a non-wear surface of the first wear liner segment, wherein the first protrusion is located in the first depression;
a second wear liner segment located over the first surface of the friction disk core, wherein the first wear liner segment is circumferentially adjacent to the second wear liner segment, and wherein the first wear liner segment and the second wear liner segment each comprise a carbon composite material;
a third wear liner segment located over the second surface of the friction disk core, the third wear liner segment comprising a second protrusion extending from a non-wear surface of the third wear liner segment, wherein the second protrusion is located in the second depression, and wherein a wear surface of the third wear liner segment is oriented away from a wear surface of the first wear liner segment; and
a first fastener coupling the first wear liner segment and the third wear liner segment to the friction disk core, wherein the first fastener extends through the first protrusion, the second protrusion, and the portion of the friction disk core located between the bottom surface of the first depression and the bottom surface of the second depression.

2. The friction disk of claim 1, further including:
a fourth wear liner segment located over the second surface of the friction disk core wherein the fourth wear liner segment is circumferentially adjacent to the third wear liner segment; and
a second fastener coupling the second wear liner segment and the fourth wear liner segment to the friction disk core.

3. The friction disk of claim 1, wherein the friction disk core comprises a rotor core.

4. The friction disk of claim 1, wherein the friction disk core comprises a stator core.

5. The friction disk of claim 1, wherein the first wear liner segment and the second wear liner segment each comprise a flange extending from an outer circumferential surface.

6. The friction disk of claim 1, wherein the first wear liner segment and the second wear liner segment each comprise a flange extending from an inner circumferential surface.

7. The friction disk of claim 1, further comprising an annularly shaped wear liner disposed over the second surface of the friction disk core, the annularly shaped wear liner comprising a plurality of wear liner segments, the plurality of wear liner segments including the third wear liner segment.

8. A multi-disk brake system, comprising:
a first friction disk comprising:
a first friction disk core;
a first wear liner located over a first surface of the first friction disk core, the first wear liner comprising a plurality of first wear liner segments, wherein the plurality of first wear liner segments jointly form a first generally annular structure, and wherein each first wear liner segment of the plurality of first wear liner segments includes a first protrusion extending axially from a non-wear surface of each first wear liner segment;
a second wear liner located over a second surface of the first friction disk core opposite the first surface of the first friction disk core, the second wear liner comprising a plurality of second wear liner segments, wherein the plurality of second wear liner segments jointly form a second generally annular structure, and wherein each second wear liner segment of the plurality of second wear liner segments includes a second protrusion extending axially from a non-wear surface of each second wear liner segment; and
a first fastener coupling a first wear liner segment of the plurality of first wear liner segments and a second wear liner segment of the plurality of second wear liner segments to the first friction disk core, wherein the first fastener extends through the first protrusion of the first wear liner segment, the second protrusion of the second wear liner segment, and a portion of the first friction disk core located between the first wear liner segment and the second wear liner segment, and wherein the first protrusion of the first wear liner segment is located in a first depression defined by the first surface of the first friction disk core, and wherein the second protrusion of the second wear liner segment is located in a second depression defined by the second surface of the first friction disk core; and
a second friction disk comprising:
a second friction disk core; and
a third wear liner located over a first surface of the second friction disk core, the third wear liner comprising a plurality of third wear liner segments, wherein the plurality of third wear liner segments jointly form a third generally annular structure, and wherein each third wear liner segment of the plurality of third wear liner segments includes at least one of a third flange extending radially inward from an inner circumferential surface of each third wear liner segment or a third protrusion extending axially from a non-wear surface of each third wear liner segment.

9. The multi-disk brake system of claim 8, further including:

a plurality of second fasteners coupling the plurality of third wear liner segments to the second friction disk core.

10. The multi-disk brake system of claim 9, wherein the first fastener is recessed with respect to a first wear surface of the first wear liner and a second wear surface of the second wear liner.

11. The multi-disk brake system of claim 8, wherein the first wear liner and the second wear liner comprise a carbon composite material.

12. The multi-disk brake system of claim 8, wherein the plurality of first wear liner segments comprises between three first wear liner segments and six first wear liner segments.

13. A wear liner for a friction disk, the wear liner comprising:
   a plurality of wear liner segments comprising a carbon composite material, wherein
   the plurality of wear liner segments jointly form a generally annular structure, and wherein each wear liner segment of the plurality of wear liner segments comprises a wear surface and a protrusion extending axially from a non-wear surface of each wear liner segment, the non-wear surface of each wear liner segment being opposite the wear surface of each wear liner segment, wherein each wear liner segment defines a fastener opening located through the protrusion of each wear liner segment, and wherein each protrusion has at least one of a cylindrical shape or a frustoconical shape.

14. The wear liner of claim 13, wherein the plurality of wear liner segments comprises between three wear liner segments and six wear liner segments.

* * * * *